(12) United States Patent
Abram

(10) Patent No.: US 7,556,521 B2
(45) Date of Patent: Jul. 7, 2009

(54) DOCKING STATION FOR PERSONAL COMPUTER HAVING BASE MEMBER AND PIVOTALLY ATTACHED CRADLE MEMBER

(75) Inventor: Richard Anthony Abram, Curdworth (GB)

(73) Assignee: Tempus Computers Limited, Birmingham (GB)

( * ) Notice: Subject to any disclaimer, the term of this patent is extended or adjusted under 35 U.S.C. 154(b) by 0 days.

(21) Appl. No.: 10/593,977

(22) PCT Filed: Mar. 23, 2005

(86) PCT No.: PCT/GB2005/001095

§ 371 (c)(1),
(2), (4) Date: Aug. 14, 2007

(87) PCT Pub. No.: WO2005/001095

PCT Pub. Date: Oct. 6, 2005

(65) Prior Publication Data

US 2007/0291446 A1    Dec. 20, 2007

(30) Foreign Application Priority Data

Mar. 23, 2004    (GB) .................. 0406439.0

(51) Int. Cl.
*H01R 13/625* (2006.01)
*H01R 4/50* (2006.01)
*H05K 5/00* (2006.01)
*H05K 7/00* (2006.01)

(52) U.S. Cl. .................. 439/341; 361/679.41

(58) Field of Classification Search .................. 439/341, 439/142, 372, 928; 361/686, 683, 684, 685, 361/679.41, 679.42, 679.43, 679.44, 679.45
See application file for complete search history.

(56) References Cited

U.S. PATENT DOCUMENTS

| 5,808,373 | A | * | 9/1998 | Hamanishi et al. ......... 307/10.1 |
| 6,042,414 | A | | 3/2000 | Kunert et al. |
| 6,169,655 | B1 | | 1/2001 | Helot |
| 6,220,883 | B1 | * | 4/2001 | Helot et al. .................. 439/341 |
| 6,264,484 | B1 | | 7/2001 | Chien et al. |
| 6,264,488 | B1 | | 7/2001 | Helot et al. |
| 6,280,212 | B1 | | 8/2001 | Nguyen et al. |
| 6,285,911 | B1 | | 9/2001 | Watts, Jr. et al. |
| 6,443,574 | B1 | * | 9/2002 | Howell et al. ................. 353/13 |
| 6,788,528 | B2 | * | 9/2004 | Enners et al. ............... 361/683 |
| 2002/0048982 | A1 | | 4/2002 | Gu et al. |
| 2007/0101039 | A1 | * | 5/2007 | Rutledge et al. ............ 710/303 |

FOREIGN PATENT DOCUMENTS

EP    0 795 437    9/1997

* cited by examiner

*Primary Examiner*—Chandrika Prasad
(74) *Attorney, Agent, or Firm*—Buchanan Ingersoll & Rooney PC

(57) ABSTRACT

A computer docking apparatus for use with a portable computer, particularly in vehicles, having a cradle member suitable for receiving a portable computer and a closure member, and electrical connector assembly that operably makes power and/or data transfer connections to the computer, the connector assembly being attached to the closure member the position of which may be changed such that the computer may be inserted into or removed from the cradle when the closure member is in a first position and moving the closure member from this first position to a second position causes the electrical connector assembly to engage the computer to allow power and/or data-transfer connections between the docking apparatus and the computer.

20 Claims, 6 Drawing Sheets

DOCKING STATION FOR PERSONAL COMPUTER HAVING BASE MEMBER AND PIVOTALLY ATTACHED CRADLE MEMBER

TECHNICAL FIELD

The present invention relates to a docking station for a portable computer.

BACKGROUND OF THE INVENTION

The apparatus of the present invention is particularly well suited for use in a vehicle; for example the rear of a van. However it may also be used for static storage; for example to charge or securely store a laptop during periods of non-use.

Docking stations for laptop computers are widely available. While some such docking stations are designed for use in vehicles, these generally aim to assist an occupant of the vehicle to safely use such a computer. Portable computers are widely used by service engineers and the like who travel from site to site in vans carrying service parts. Typically, such a user requires access to the laptop on arrival at a site; often desiring to remove the laptop from the vehicle for on-site use. Further, the engineer may receive data via the laptop while in transit or use the laptop in transit; for example, as part of a global positioning system to assist navigation. In addition after several such visits there is often a need to recharge such device.

SUMMARY OF THE INVENTION

An aim of the present invention is to provide an improved portable computer docking station. A further aim is to provide apparatus that allows electrical connectors in the apparatus, in use, to be accurately aligned with and then engage/abut corresponding terminals on a portable computer to allow data transfer. Accurate alignment is important if premature wear of electrical connections between the apparatus and a portable computer is to be avoided. A further aim is to provide apparatus that securely holds a portable computer within a moving vehicle. Another aim is to provide apparatus that allows a portable computer to be securely stowed away so as to deter theft. A further aim is to provide an apparatus that allows a portable computer to be readily stowed away and to be charged and/or send and receive data while being stowed.

In one aspect the invention provides a computer docking apparatus for use with a portable computer comprising a cradle member suitable for receiving a portable computer and a base member; a electrical contactor assembly configured to operably engage a corresponding terminal on a computer and attached to the base member; adjustment means that allow the position of the cradle member to be changed relative to the base member from a first position to a second position, such that a portable computer may be inserted into or removed from the cradle when in the first position, and in the moving the apparatus from the first position to the second position causes the electrical contactor assembly to engage the computer to allow the establishment power and/or data-transfer connections between the docking apparatus and the computer.

In another aspect the invention provides a computer docking apparatus for use with a portable computer comprising: a cradle member suitable for receiving a portable computer; a closure member; and an electrical connector assembly that operably makes power and/or data-transfer connections to the computer, the connector assembly being attached to the closure member wherein; the position of the closure member relative to the cradle member may be changed such that the computer may be inserted into or removed from the cradle when the closure member is in the a first position and moving the closure member from this first position to a second position causes the electrical connector assembly to engage the computer to allow power and/or data-transfer connections between the docking apparatus and the computer.

The adjustment means may comprise a pivotal connection between the cradle member and the base member. The adjustment means may also take many other forms; for example telescopic mounts that allow all or part of the cradle member to move relative to the base member using gas struts, telescopic arms and the like and optionally providing generally parallel movement of the base member relative to the carrier member.

The base member may be an under-side tray and this tray may also either allow or prevent a portable computer to be inserted within the cradle. The underside tray may have locking means for securing the underside tray to the cradle member in a closed position; preferably the lock is a high security type lock, to deter theft.

The electrical contactor assembly may comprise a plurality of electrodes and these electrodes may supported on the electrical contactor assembly by resilient means; for example by using a leaf-spring electrode. The electrical contactor assembly may be slideably mounted to the base member; for example at least one bore in the slide mount may be dimensioned to closely slide within a shaft member mounted to the cradle member. The bore may be biased in a direction away from the base member by a spring or the like; thus, biasing means such as a spring may, in use, bias the mount in a direction towards the corresponding terminal of a portable computer.

Preferably, the cradle member comprises a main outer body member and an insert member made at least in part from plastics material or other materials that avoid undue wear of the computer case in use. The cradle preferably has alignment means that ensure that when a portable computer is fully inserted within the cradle that the electrical contactor assembly is accurately aligned with a corresponding terminal on the computer. The alignment means may comprise guide members or rails located on the inside of the cradle member or insert member and/or an aperture in the insert member at least partly surrounded by a guide wall. The alignment means are particularly beneficial when it is necessary for the contactor assembly to have many terminals; for example in some cases up to 100 pins/electrodes may be required. In such cases alignment is particularly critical if damage to the contactor mechanism through prolonged use is to be avoided.

The apparatus preferably includes a power supply unit for providing power to a computer and/or charging cells in the computer; this may be located in a rear panel that also includes at least one interface printed circuit board.

The cradle member may be fixed to a mounting; for example, in a vehicle, so that in use the base member moves and the cradle member is static. Alternatively, the base member may be fixed to a mounting so that in use the cradle member moves and the base member is static. The position of the base member relative to the cradle member may be adjusted by electro-mechanical means.

The electrical contactor assembly may engage a corresponding terminal on the underside of a portable computer or it may engage a corresponding terminal on the rear or side of a portable computer.

The apparatus is particularly for use in any vehicle, and particularly a road vehicle such as a service van.

BRIEF DESCRIPTION OF THE DRAWINGS

The invention will now be described by reference to the following diagramatic drawings in which.

DETAILED DESCRIPTION OF THE PREFERRED EMBODIMENTS

Figure 1:
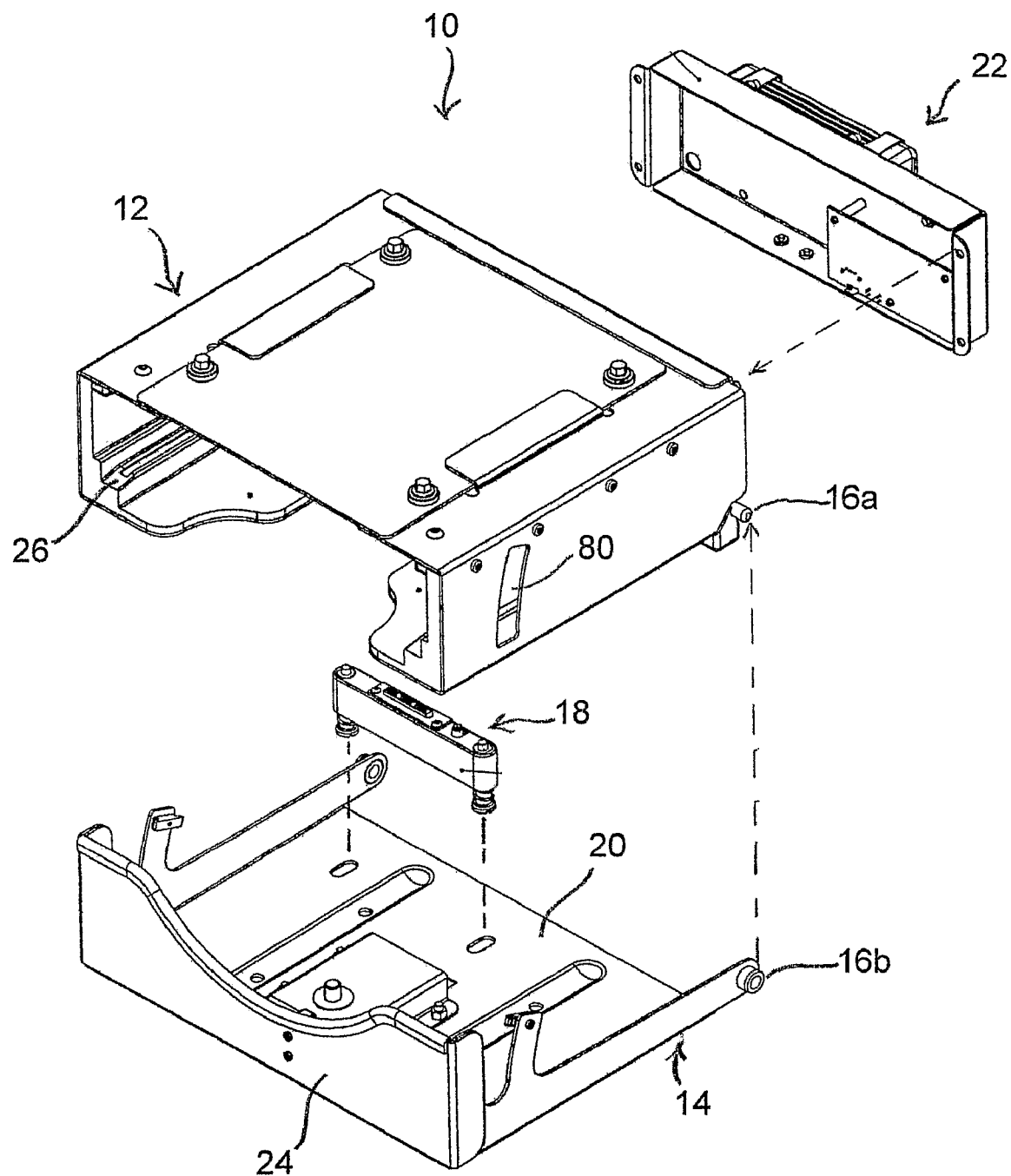
FIG. 1 shows a preferred embodiment of the invention in as a perspective view in exploded form.

Referring to FIG. 1; this shows the four major components of a preferred embodiment of the apparatus according to the invention. The docking station 10 comprises a cradle member 12; a lower tray 14 pivotably attached to the cradle by pivot means 16a, 16b located at the rear of the cradle member 12 and of the lower tray 14. Electrical connector assembly 18 is mounted by resilient means to the base 20 of lower tray 14. A power supply and/or interface panel 22 is secured to the rear of cradle member 12. The electrical connector assembly receives power supply and data input/output connections via interface panel 22. In use the front face 24 of lower tray pivots downwardly, about pivots 16a, 16b so that it is clear of the front opening of the cradle member 12. This allows a portable computer such as a laptop computer to slide into the cradle; optionally assisted by alignment means such as guide rails 26. The lower tray 14 may the be closed by pivoting upwardly and locked in this closed position. As the lower tray is closed electrical connector assembly 18 also moves upwardly and engages a multi-way electrical connector located on the underside of the inserted computer (not shown). Thus, in a single movement of the lower tray 16 about pivot 16 the apparatus is closed and electrical contact is made between the laptop and external services.

Figure 2:
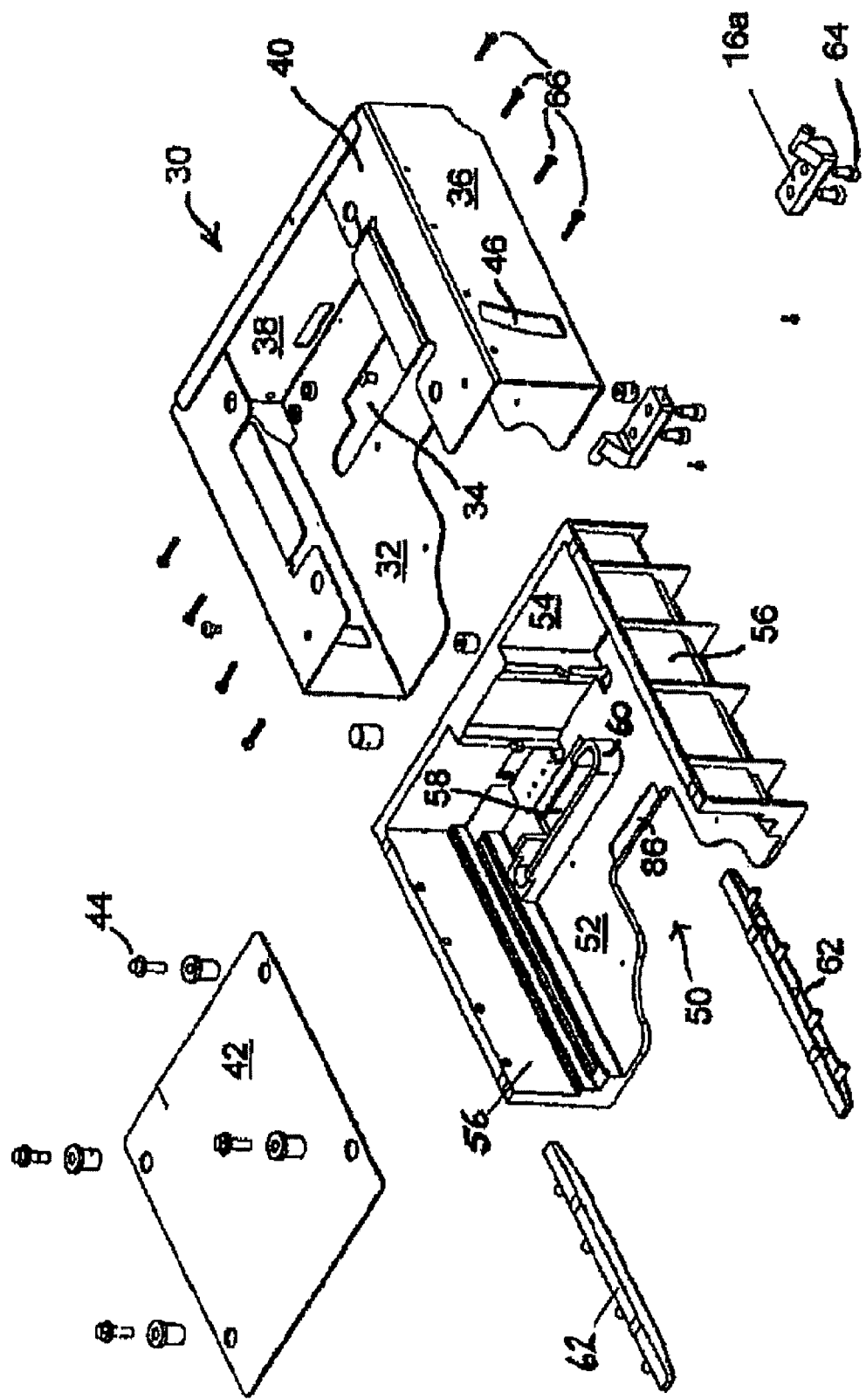
FIG. 2 shows the upper part of the apparatus of FIG. 1 in more detail.

FIG. 2 shows the cradle member 12 in more detail. The main body of the cradle 30 comprises a lower plate 32 with an aperture 34 provided to allow pivotal movement of the connector assembly 18 and a larger opening at the front end to accommodate a lock fitted to the lower tray 14 (see below). The main body 30 further comprises side walls 36 and rear wall 38. The roof of the main body 30 comprises roof side sections 40 and central panel 42 attached to the side panels by bolts 44. Each side wall 36 has an arcuate shaped slot 46 that engages a member of the lower tray 14 (see below) to limit the degree to which this lower member may pivot downwardly. Main body 30 is preferably made of a metallic material; for example steel, and houses a plastic insert member 50 that has a base 52, a rear wall 54 and side walls 56 that are in general dimensioned to fit closely within the main body 30 and are secured therein by bolts/screws 66. Base 52 has an aperture 58 formed from the base and also from surrounding wall 60 so that in use it is aligned with aperture 34 in the main body. In addition to lower guide rails 26, the side walls 56 each have an upper guide rail 62, secured in place by bolts/screws 66. The lower rear corners of the main body each have a pivot member 16a attached thereto by means of bolts 64 or the like.

Figure 3:
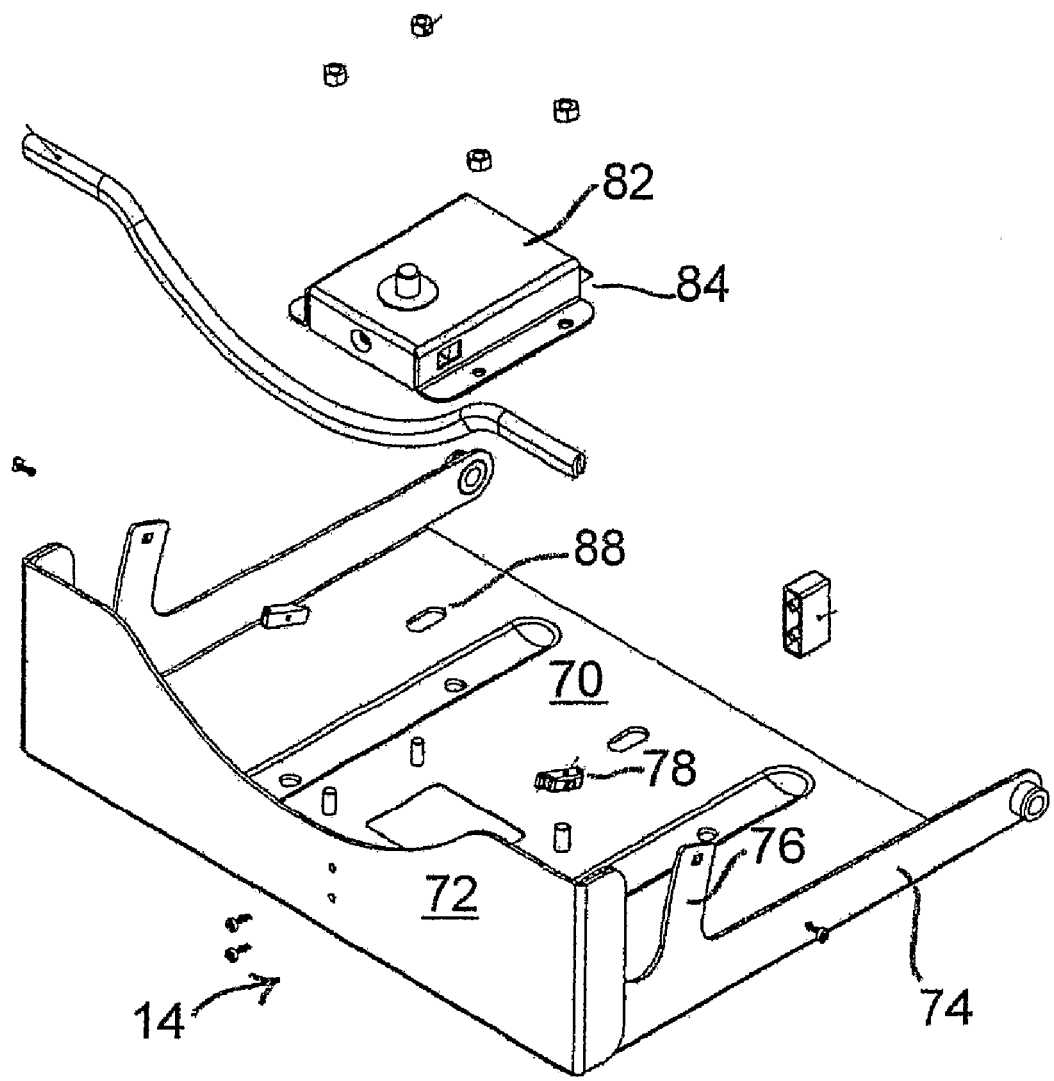
FIG. 3 shows the lower part of the apparatus of FIG. 1 in more detail.

FIG. 3 shows the lower tray 14 in more detail. Lower tray 14 comprises a base 70, a front panel 72, and a pair of side walls 74 each with an arcuate-shaped extension member 76. In use, arcuate member 76 co-operates with slot 46 to limit the degree to which the lower tray may pivot relative to the cradle member 12. End stops 78 are attached by a bolt to the free end of each arcuate member which in use abut a stop bar 80 (see FIG. 1) located across the arcuate slot 46. A lock 82 is attached by bolts to base 70 and has a catch member 84 that in use engages a slight recess 86 (see FIG. 2) within lower plate 32 of main body cradle 30.

Figure 4:
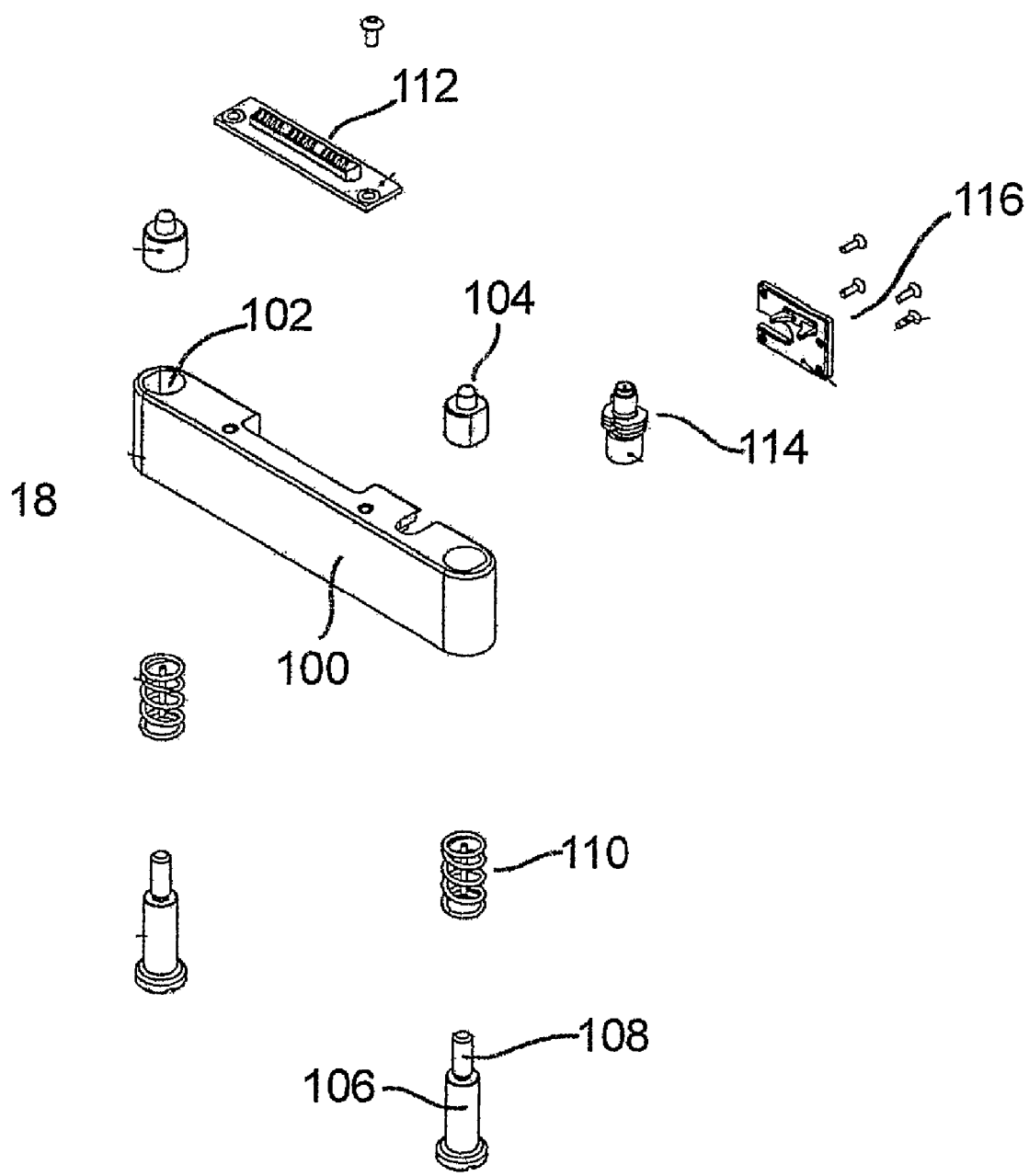
FIG. 4 shows the electrical connector assembly of FIG. 1 in more detail.

FIG. 4 shows an enlarged perspective view of electrical contactor assembly 18. Assembly 18 comprises a slide mount 100 with bores 102 at each end dimensioned to allow heads 104 to slide closely therewithin. Heads 104 have taper threads (not shown) that connect with threaded ends 108 of mounting shafts 106. Heads 104 each have a flat face to assist tightening and bores 102 are correspondingly shaped. In use, mounting shafts 106 are attached to tray member 14 and springs 110 are positioned around shafts 106 and between lower tray 14 and slide mount 100. Electrical contactors 112, 114 are fixed to the top face of slide mount 100 by screws and fixing plate 116 respectively. Connector 112 comprises 15 individual spring leaf electrodes.

Figure 5:
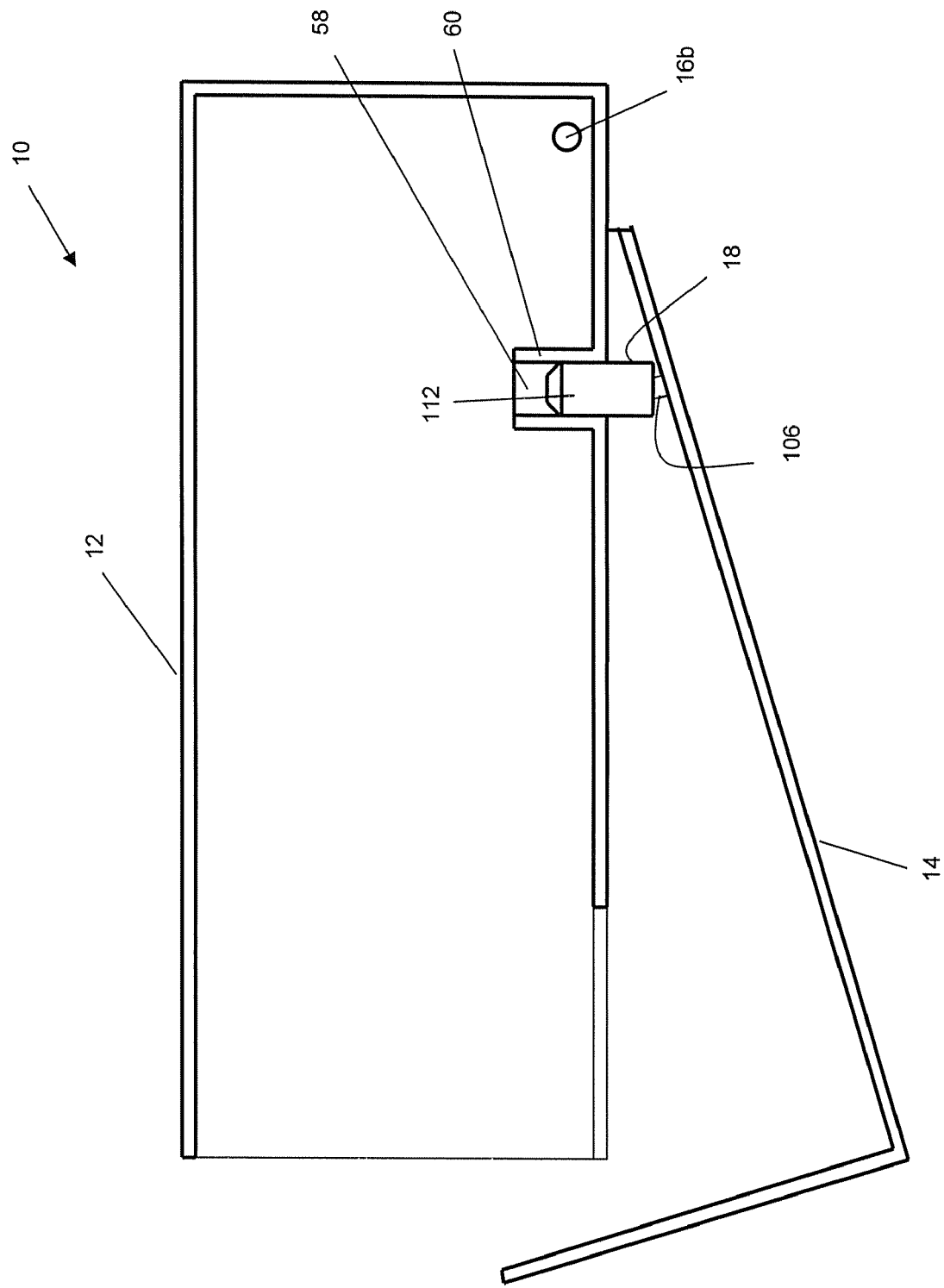
FIG. 5 is a schematic cross section of the apparatus in a first position.
Figure 6:
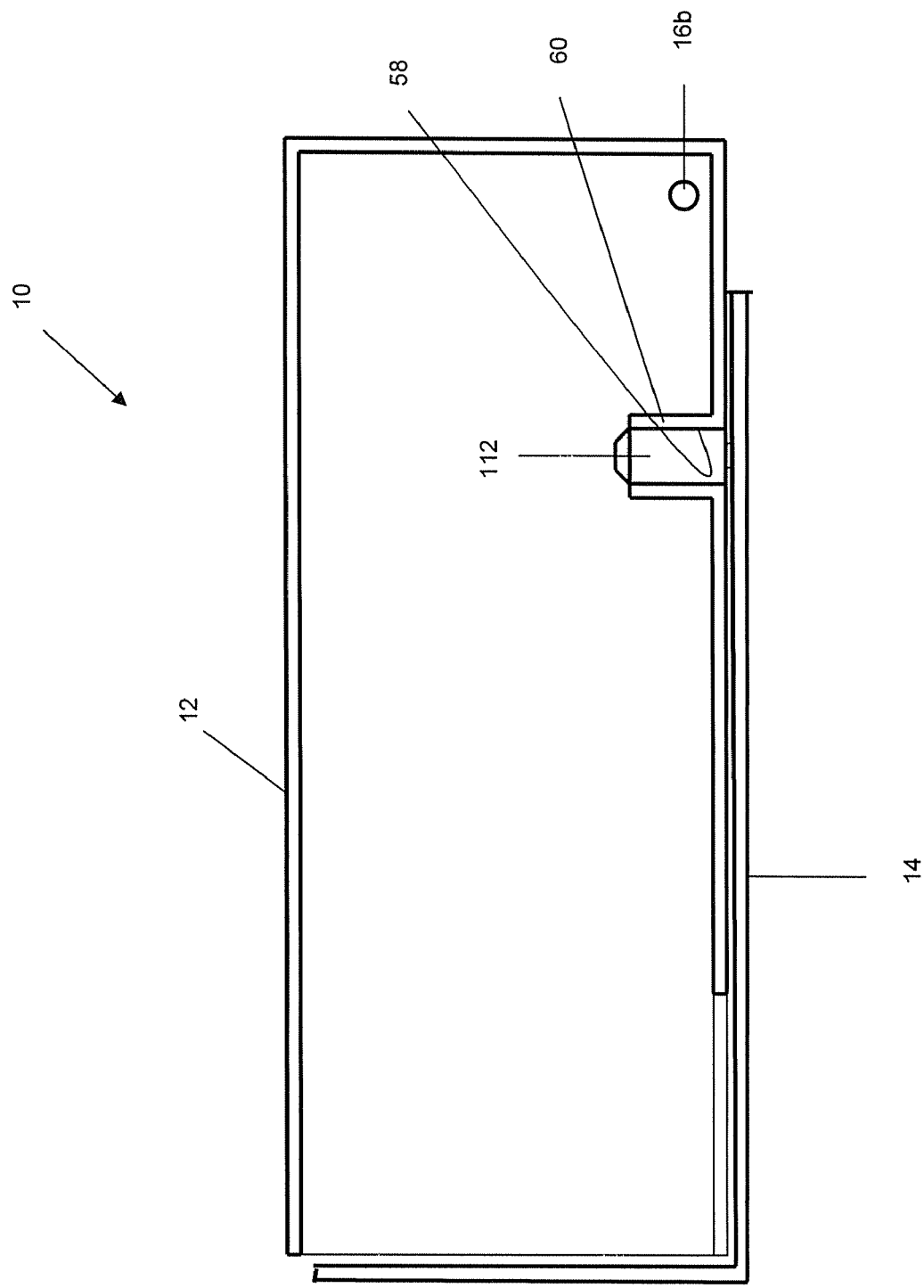
FIG. 6 is a schematic cross section of the apparatus in a second position.

Referring also to FIGS. 5 and 6, contactor assembly 18 is located within aperture 58 and surrounding wall 60 of insert member 50. In use, assembly 18 moves upwardly and downwardly through aperture 58 and guide wall 60 as the lower tray is closed and opened respectively. Springs 110 and leaf spring electrodes 112 provide resilience upon contact between the connector 18 and the underside of a portable computer. This ensures that the electrodes are firmly held in place, but excessive force that might damage the contacting mechanism is avoided. The upper tapered portion of heads 104 engage holes in the base of the portable computer (not shown) and thus ensure general alignment of the connector prior to electrical engagement.

Where electro-mechanical means are used to alter the position of the base member relative to the cradle member, this may automatically activated by insertion of the portable computer within the cradle member; this is particularly beneficial if closure means are also activated directly or indirectly by this electro-mechanical means. Thus, on insertion of a portable computer the electro-mechanical means may move the closure member to prevent removal of the computer and move the electrical contactor assembly to make contact with the computer. The closure means need not necessarily be a door or the like, it can comprise means of locking the portable computer within the cradle. Further, partial insertion of the portable computer within the cradle may activate electro-mechanical means that complete the insertion process. Locking of the personal computer to the cradle or locking of a tray member, door or the like may be automatic upon insertion or part insertion of the portable computer within the cradle.

The base member need not necessarily be connected to any closure means. Thus, when the apparatus is in a first position a portable computer may be inserted within the cradle without causing possible damage to the electrical contactor assembly. However, in the second position the electrical contactor assembly moves (with the base member) so that it abuts contacts on the portable computer. In this second position removal of the portable computer is restrained in order to prevent possible damage to the contactor assembly.

The invention claimed is:

1. A computer docking apparatus for use with a portable computer comprising a cradle member suitable for receiving a portable computer and a base member; an electrical contactor assembly configured to operably engage a corresponding terminal on a computer and attached to the base member;

adjustment means that allow the position of the base member to be changed relative to the cradle member from a first position to a second position, such that the portable computer may be inserted into or removed from the cradle member when in the first position, and wherein moving the base member relative to the cradle member from the first position to the second position causes the electrical contactor assembly to engage the computer to allow the establishment of power and/or data-transfer connections between the docking apparatus and the computer, wherein the cradle member has alignment means that ensure that when the portable computer is fully inserted within the cradle member that the electrical contactor assembly is accurately aligned with a corresponding terminal on the computer, and wherein the alignment means comprises an aperture in the cradle member at least partly surrounded by a guide wall such that in use the electrical contactor assembly is guided by the wall when the base member is moved relative to the cradle member from the first position to the second position, and further wherein the contactor assembly is resiliently mounted with respect to the base member.

2. The apparatus according to claim 1 wherein the adjustment means comprises mechanical or electro-mechanical means.

3. The apparatus according to claim 2 wherein the adjustment means comprises a pivotal connection between the cradle member and the base member.

4. The apparatus according to claim 1 wherein the base member comprises an under-side tray.

5. The apparatus according to claim 4 wherein the under-side tray has locking means for securing the underside tray to the cradle member in a closed position.

6. The apparatus according to claim 1 wherein the cradle member comprises a main outer body member and an insert member made at least in part of plastics material, carbon-fibre, rubber or a similar materials that avoid undue wear to the outer case of the portable computer due to repeated insertion and removal.

7. The apparatus according to claim 1 wherein the alignment means comprise guide members located on the inside of the cradle member.

8. The apparatus according to claim 1 wherein the electrical contactor assembly comprises a slide mount attached to the cradle member either directly or indirectly and biasing means that, in use, bias the mount in a direction towards the corresponding terminal of the portable computer.

9. The apparatus according to claim 8 wherein the slide mount comprise at least one bore in the slide mount with a pin dimensioned to closely slide within the bore and the biasing means comprises a spring.

10. The apparatus according to claim 1 wherein the cradle member is fixable to a mounting so that in use the base member is movable and the cradle member is static.

11. The apparatus according to claim 1 wherein the base member is fixed to a mounting so that in use the cradle member moves and the base member is static.

12. The apparatus according to claim 1 further comprising closure means that either allow or prevent the portable computer to be inserted within the cradle.

13. The apparatus according to claim 12 wherein the closure means is securable in the second position by means of a high security lock to deter theft.

14. The apparatus according to claim 1 wherein the electrical contactor assembly engages a corresponding terminal on the side, rear or underside of the portable computer.

15. The apparatus according to claim 1 used in a vehicle.

16. The apparatus according to claim 6 wherein the cradle member has alignment means that ensure that when a portable computer is fully inserted within the cradle that the electrical contactor assembly is accurately aligned with a corresponding terminal on the computer and the alignment means comprise guide members located on the insert member.

17. A computer docking apparatus for use with a portable computer comprising: a cradle member suitable for receiving and housing a portable computer; a base member; and an electrical connector assembly operably configured to engage a corresponding terminal on the personal computer, the connector assembly being attached to the base member wherein adjustment means are further provided that allow the position of the base member to be changed relative to the cradle member from a first position to a second position such that moving from the first position to the second position both closes the apparatus such that the portable computer cannot be removed from within the apparatus and causes the electrical connector assembly to engage the computer to allow power and/or data-transfer connections between the docking apparatus and the computer, and wherein the apparatus is configured such that a partial receiving of the portable computer in the cradle member may prevent the base member moving relative to the cradle member from the first position to the second position.

18. The apparatus according to claim 17 wherein the adjustment means comprises a pivotable connection between the cradle member and the base member.

19. The apparatus according to claim 17 wherein the cradle member has alignment means to ensure that when a portable computer is fully inserted within the cradle the electrical contactor assembly is accurately aligned with a corresponding terminal on the computer.

20. Apparatus according to claim 19 wherein the alignment means comprise guide members located on the inside of the cradle member.

* * * * *